US008537313B2

(12) United States Patent
Liou et al.

(10) Patent No.: US 8,537,313 B2
(45) Date of Patent: Sep. 17, 2013

(54) LIQUID CRYSTAL DISPLAY APPARATUS AND COLOR FILTER SUBSTRATE

(75) Inventors: Meng-Chi Liou, Taoyuan Hsien (TW); Ching-Yi Chen, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 0 days.

(21) Appl. No.: 13/366,359

(22) Filed: Feb. 6, 2012

(65) Prior Publication Data

US 2013/0027644 A1 Jan. 31, 2013

(30) Foreign Application Priority Data

Jul. 27, 2011 (TW) .............................. 100126630 A

(51) Int. Cl.
G02F 1/1335 (2006.01)
G02F 1/1333 (2006.01)
G02F 1/1337 (2006.01)

(52) U.S. Cl.
USPC ............................ 349/106; 349/110; 349/129

(58) Field of Classification Search
USPC .................................................. 349/111, 106
See application file for complete search history.

(56) References Cited

U.S. PATENT DOCUMENTS

| 7,847,894 | B2 | 12/2010 | Rho |
| 7,847,908 | B2 | 12/2010 | Tanno |
| 2010/0066954 | A1* | 3/2010 | Wang et al. ................... 349/106 |
| 2012/0033168 | A1* | 2/2012 | Hwang et al. ................. 349/139 |

FOREIGN PATENT DOCUMENTS

| TW | I320503 | 2/2010 |
| TW | I326775 | 7/2010 |

\* cited by examiner

Primary Examiner — Wen-Ying P Chen
(74) Attorney, Agent, or Firm — CKC & Partners Co., Ltd.

(57) ABSTRACT

The invention discloses a liquid crystal display apparatus and a color filter substrate. The color filter substrate can be used in a display module. The color filter substrate may include a glass substrate, a light-shielding matrix, a color layer and one or multiple transparent conductive films disposed on the same side of the glass substrate. There is at least one slit structure formed on one of the transparent conductive films. Each slit structure corresponds to the color layer respectively. The one or multiple transparent conductive films can be used for shielding a liquid crystal layer of the display module.

5 Claims, 8 Drawing Sheets

LIQUID CRYSTAL DISPLAY APPARATUS AND COLOR FILTER SUBSTRATE

RELATED APPLICATIONS

This application claims priority to Taiwan Application Serial Number 100126630, filed Jul. 27, 2011, which is herein incorporated by reference.

BACKGROUND

1. Field of Invention

The present invention relates to a liquid crystal display apparatus. More particularly, the present invention relates to a liquid crystal display apparatus with a wide viewing angle.

2. Description of Related Art

Liquid crystal display (LCD) screens are popular among consumers because of their many advantages, such as low cost, high resolution and high stability. There are many digital display devices/technologies that have been developed recently. The Twisted Nematic (TN) LCD screen and the Multi-domain Vertical Alignment (MVA) LCD screen are examples of such digital display devices/technologies.

In an LCD module, a liquid crystal cell (LC cell) is disposed between two opposing transparent conductive films. The movement of the liquid crystals is controlled by an electric field and the electric field lines between these two opposing transparent conductive films. The liquid crystal cell may cooperate with upper and lower polarization films to adjust the transmittance of light generated by a backlight source.

The size of a pixel unit in a high definition LCD device is very small. For example, the size of one pixel unit is only 34.5 µm×103.5 µm in a 3.5-inch LCD device with an 80×480 resolution. In this case, only a part of the projecting light may penetrate the pixel unit. The ratio of light penetrating the pixel unit (aperture ratio) in a traditional LCD device is very low. In a traditional LCD device manufactured by a five-mask process, the aperture ratio is about 38%.

There are wave-shaped protruding portions disposed on a transparent conductive film in a Multi-domain Vertical Alignment (MVA) LCD device with a wide viewing angle. However, the protruding portions will damage the aperture ratio of the pixel units. In order to elevate the aperture ratio of the pixel units, the Patterned Vertical Alignment (PVA) process is adopted in the display device with a wide viewing angle, because the protruding portions in the MVA process may damage the aperture ratio and have a minimal size limitation (e.g., the width of the transparent conductive film with the protruding portion can not be smaller than 16 µm in general) due to limitations encountered during manufacture. In comparison, the Patterned Vertical Alignment (PVA) process utilizes a transparent conductive film with round or elongated Indium Tin Oxide (ITO) slits, and the width of the transparent conductive film can be 10 µm or less.

In a practical application, the difference between aperture ratios realized when using the MVA process employing protruding portions and the PVA process employing ITO slits can reach 10% in a 4-inch LCD device with an 800×480 resolution.

However, after the transparent conductive film of the color filter substrate in the PVA process is patterned (i.e., by forming slits or holes), the slits or holes will allow some external electric fields or electric field lines to enter the liquid crystal layer to thereby interfere with the liquid crystal behavior of the liquid crystal layer. In particular, the liquid crystal cells in In-Plane Switching (IPS) devices or Fringe Field Switching (FFS) devices will be affected by external electric fields or electric field lines because there is no transparent conductive film on their color filters. For example, after a finger contacts the surface of the LCD device, electrostatic charges from the finger will remain on the surface of the LCD device and continuously interfere with the displaying function of the LCD device. This will result in a whitened area or an uneven brightness on the panel.

In other words, display panels with ITO slits on the transparent conductive film of the color filter substrate may have advantages of higher aperture ratio and thinner size, but also have disadvantage of the displaying function being affected by external electric fields or electrostatic charges accumulated on the surface.

In order to solve the aforesaid problems, a prior art solution involves the use of a transparent conductive film which is connected to a fixed voltage and disposed on the outer surface of a color filter substrate. With the use of this solution, electrostatic charges accumulated on the surface are dispersed and external electric fields are shielded. However, such a solution involves a process on the back side of the color filter substrate. Since traditional equipment usually focuses on a process performed on the inner surface of the color filter substrate, the process performed on the back side thereof requires the use of extra equipment, and therefore additional investment is required. Furthermore, the transparent conductive film (ITO conductive film) exposed on the outer surface of the color filter substrate may be scratched or damaged during manufacture or user operation, such that the yield rate and the lifetime of the product are reduced.

SUMMARY

In order to solve the aforesaid problem, this disclosure provides a color filter substrate and a liquid crystal display apparatus. The color filter substrate includes a shielding structure on the inner side of the color filter substrate. The shielding structure may correspond to various kinds of display panels with ITO openings (e.g., slits or round holes), for example, a Patterned Vertical Alignment (PVA) display panel, an In-Plane Switching (IPS) display panel, a Fringe Field Switching (FFS) display panel, etc. The shielding structure can be used for solving the problem of electrostatic charge interference to the display panel without adopting a back side process on the color filter substrate, such that no extra investment or equipment for the back side process are needed. Therefore, the color filter substrate of the invention can be produced at a low cost.

An aspect of the invention is to provide a color filter substrate for a liquid crystal display (LCD) apparatus. The color filter substrate includes a glass substrate, a light-shielding matrix, a color layer, a first transparent conductive film and a second transparent conductive film. The light-shielding matrix is disposed between the glass substrate and the color layer. The first transparent conductive film has at least one slit structure. Each of the slit structure(s) corresponds to the color layer respectively. The first transparent conductive film and the second transparent conductive film are disposed on the same side of the glass substrate.

According to an embodiment of the invention, the liquid crystal display apparatus includes a lower substrate and a liquid crystal layer. The liquid crystal layer is disposed between the lower substrate and the color filter substrate. The second transparent conductive film is used for forming a complete shielding plane corresponding to the liquid crystal layer. In the embodiment, the second transparent conductive film is disposed between the color layer and the liquid crystal layer.

According to an embodiment of the invention, the second transparent conductive film is disposed between the glass substrate and the light-shielding matrix.

According to an embodiment of the invention, the second transparent conductive film is disposed between the light-shielding matrix and the color layer.

Another aspect of the invention is to provide a color filter substrate for a liquid crystal display (LCD) apparatus. The color filter substrate includes a glass substrate, a color layer, a light-shielding matrix and a transparent conductive film. The color layer includes a high conductivity material. The light-shielding matrix is disposed between the glass substrate and the color layer. The transparent conductive film has at least one slit structure. Each of the slit structure(s) corresponds to the color layer respectively. The transparent conductive film is electrically connected to the color layer within a sealant area of the color filter substrate. The color layer and the transparent conductive film cooperate to form a complete shielding plane.

According to an embodiment of the invention, the high conductivity material of the color layer has a resistivity less than $10^5$ ohm-cm.

Another aspect of the invention is to provide a liquid crystal display apparatus including a lower substrate, a color filter substrate and a liquid crystal layer. The color filter substrate includes a glass substrate, a color layer, a light-shielding matrix, a first transparent conductive film and a second transparent conductive film. The light-shielding matrix is disposed between the glass substrate and the color layer. The first transparent conductive film has at least one slit structure which corresponds to the color layer. The first transparent conductive film and the second transparent conductive film are disposed on the same side of the glass substrate. The liquid crystal layer is disposed between the color filter substrate and the lower substrate. The second transparent conductive film forms a complete shielding plane corresponding to the liquid crystal layer.

According to an embodiment of the invention, the second transparent conductive film is disposed between the color layer and the liquid crystal layer.

According to an embodiment of the invention, the second transparent conductive film is disposed between the glass substrate and the light-shielding matrix.

According to an embodiment of the invention, wherein the second transparent conductive film is disposed between the light-shielding matrix and the color layer.

Another aspect of the invention is to provide a liquid crystal display apparatus including a lower substrate, a color filter substrate and a liquid crystal layer. The color filter substrate includes a glass substrate, a color layer, a light-shielding matrix and a transparent conductive film. The color layer includes a high conductivity material. The light-shielding matrix is disposed between the glass substrate and the color layer. The transparent conductive film has at least one slit structure. Each of the slit structure(s) corresponds to the color layer respectively. The transparent conductive film is electrically connected to the color layer within a border area of the color filter substrate. The liquid crystal layer is disposed between the color filter substrate and the lower substrate. The color layer and the transparent conductive film cooperate to form a complete shielding plane corresponding to the liquid crystal layer.

According to an embodiment of the invention, the high conductivity material of the color layer has a resistivity of less than $10^5$ ohm-cm.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
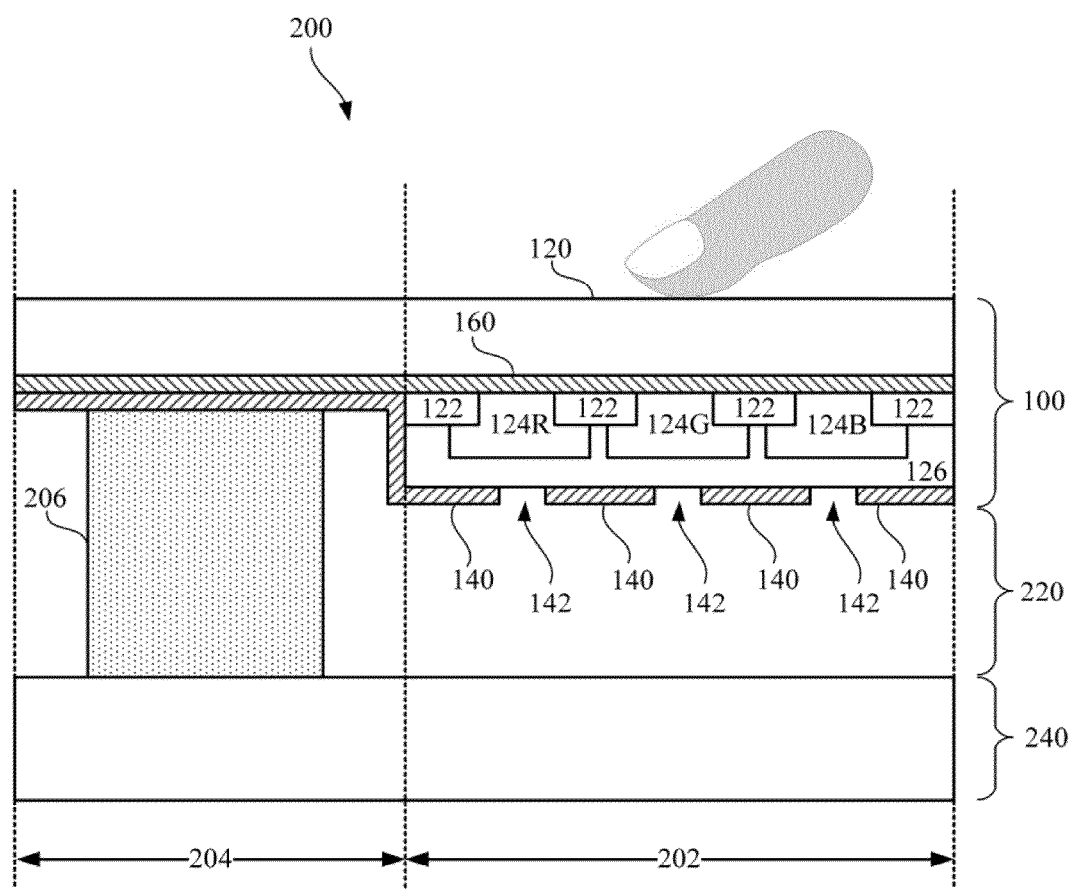
FIG. 1 is a sectional view illustrating a liquid crystal display apparatus and a color filter substrate thereof according to an embodiment of the disclosure.

Reference is made to FIG. 1, which is a sectional view illustrating a liquid crystal display (LCD) apparatus 200 and a color filter substrate 100 thereof according to a first embodiment of the disclosure. In this embodiment, the LCD apparatus 200 includes the color filter substrate 100, a liquid crystal layer 220 and a lower substrate 240.

As shown in FIG. 1, the color filter substrate 100 can be used for cooperating with a pixel structure of the LCD apparatus 200. In a practical application, the lower substrate 240 can be used for accommodating a thin-film transistor (TFT) unit of a display driving circuit of the LCD apparatus 200, but the invention is not limited to such a configuration. The liquid crystal layer 220 is disposed between the color filter substrate 100 and the lower substrate 240.

In the embodiment of FIG. 1, the color filter substrate 100 includes a glass substrate 120, a light-shielding matrix 122, a color layer 124R, a color layer 124G, a color layer 124B, a first transparent conductive film 140 and a second transparent conductive film 160 within a display area 202 of the LCD apparatus 200.

Furthermore, the color filter substrate 100 can be connected to the lower substrate 240 through a specific packaging structure 206 within a sealant area 204 of the LCD apparatus 200. Since such a means of connection are well known by those skilled in the art, a detailed description in this regard will not be provided herein. Instead, particular attention is given to the design of the color filter substrate 100 on the display area 202.

In a practical application, the color filter substrate 100 is generally the upper substrate of the LCD apparatus 200. In other words, the color filter substrate 100 usually forms the external surface of a display apparatus. As shown in FIG. 1, the upper side of the color filter substrate 100 is the external surface of the LCD apparatus 200. Users may touch the outer surface (i.e., the upper surface in FIG. 1) of the glass substrate 120 of the color filter substrate 100 with their fingers or other objects.

In the embodiment, the light-shielding matrix 122 is disposed on the inner side (i.e., the lower side in FIG. 1) of the glass substrate 120. The light-shielding matrix 122 can be used for separating display zones of different colors or separating display zones of different pixels, and the light-shielding matrix 122 may prevent abnormal light leakage. The color layers 124R, 124G and 124B are disposed on the inner side (i.e., the lower side in FIG. 1) of the glass substrate 120, and a part of each color layer 124R, 124G or 124B is disposed between two of the light-shielding matrix 122, so as to form a color display area with a red, green or blue color. The color layers 124R, 124G and 124B are illuminated with specific gray level brightness to achieve a pixel display function.

In the embodiment, the first transparent conductive film 140 has at least one slit structure 142. In the embodiment shown in FIG. 1, the first transparent conductive film 140 has a plurality of the slit structures 142. The slit structures 142 correspond in location to the color layers 124R, 124G and 124B respectively. In the embodiment, the slit structures 142 can be elongated or round, and the invention is not limited to a specific shape of the slit structures 142.

For example, a transparent conductive film of a Patterned Vertical Alignment (PVA)-type LCD apparatus 200 has the aforesaid slit structures 142, so as to achieve a faster pixel response and a higher contrast of the LCD apparatus 200. Details of the Patterned Vertical Alignment (PVA) configuration are well known by persons skilled in the art, and so a description in this regard is not provided herein.

After a finger contacts the surface (i.e., the outer surface of the glass substrate 120) of the LCD apparatus 200, electrostatic charges from the finger will remain on the glass substrate 120. In a traditional design, the electrostatic charges will continuously interfere with the display function of the LCD apparatus 200, and the electrostatic charges will result in a whitened area or uneven brightness on the panel.

In the embodiment, the color filter substrate 100 includes a second transparent conductive film 160. The second transparent conductive film 160 is disposed on the inner side (i.e., the lower side in FIG. 1) of the glass substrate 120 and on the outer side (i.e., the upper side in FIG. 1) of the light-shielding matrix 122 and the color layers 124R, 124G and 124B.

The second transparent conductive film 160 may utilize its conductivity to form a complete shielding plane corresponding to the liquid crystal layer 220, so as to block external electric field interference to the liquid crystal layer 220 of the LCD apparatus 200.

In addition, the second transparent conductive film 160 and the first transparent conductive film 140 are both disposed on the inner side of the glass substrate 120. Therefore, the embodiment can be achieved without utilizing a back side process on the color filter substrate 100, such that no extra equipment and investment are needed, and the embodiment of the invention can be manufactured at a low cost.

Furthermore, the color filter substrate 100 in a practical application may further include a flat layer 126. In the embodiment, the flat layer 126 can be disposed on the outer side of the first transparent conductive film 140 and on the inner side of the light-shielding matrix 122 and the color layers 124R, 124G and 124B.

Figure 2:
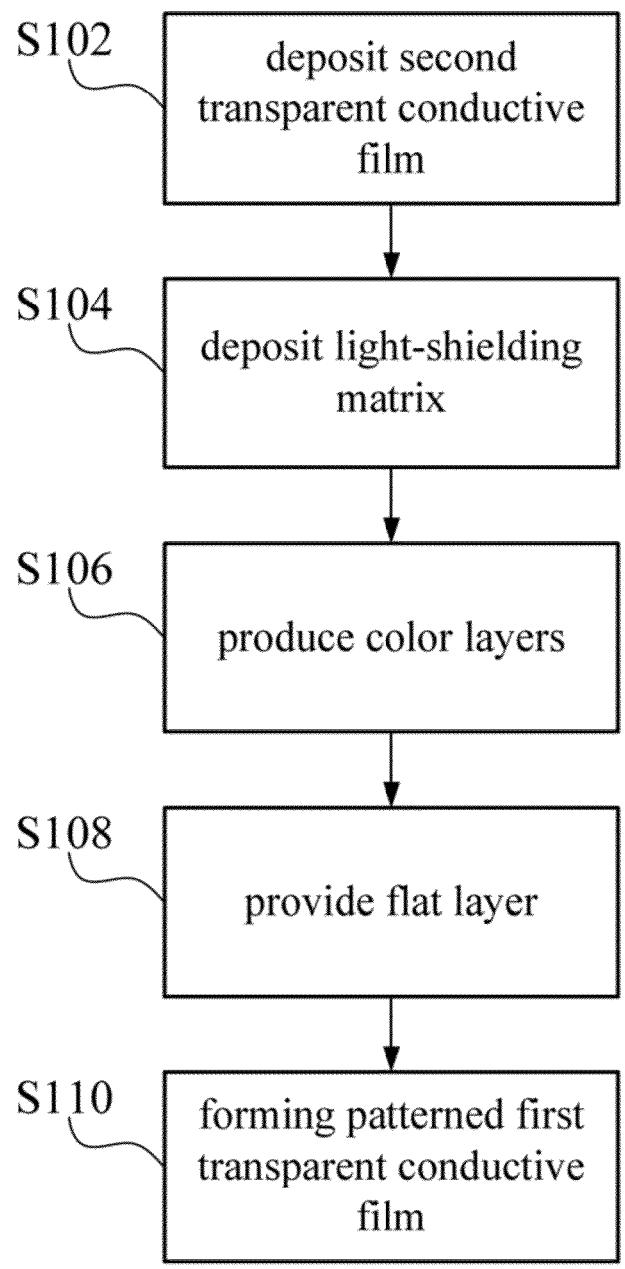
FIG. 2 is a flow chart illustrating a manufacturing method of a color filter substrate according to an embodiment of the invention.

Reference is made to FIG. 2, which is a flow chart illustrating a manufacturing method of a color filter substrate according to an embodiment of the invention. The manufacturing method can be used to produce the color filter substrate 100 shown in FIG. 1 of the aforesaid first embodiment of the invention.

As shown in FIG. 2 (and with additional reference to FIG. 1), the manufacturing method of the color filter substrate first executes step S102 to deposit the second transparent conductive film on the glass substrate. Afterward, step S104 is executed to deposit the light-shielding matrix on the second transparent conductive film for separating the display zones of different pixels or different colors. Afterward, step S106 is executed for producing color layers on the second transparent conductive film and the light-shielding matrix, e.g., forming the R, G, B color layers with a lithography process.

Afterward, step S108 is executed for providing a flat layer, which is used for covering the color layers and the light-shielding matrix. Finally, step S110 is executed for forming a patterned first transparent conductive film on the flat layer. The patterned first transparent conductive film has at least one slit structure. In this embodiment, the patterned first transparent conductive film has a plurality of the slit structures. The slit structures correspond in location to the color layers respectively.

The first embodiment of the invention discloses a color filter substrate and the manufacturing method thereof. The color filter substrate includes a shielding structure on the inner side of the color filter substrate. The shielding structure may correspond to various kinds of display panels with ITO openings (e.g., slits or round holes), for example, a Patterned Vertical Alignment (PVA) display panel, an In-Plane Switching (IPS) display panel, a Fringe Field Switching (FFS) display panel, etc. The shielding structure can be used for solving the problem of electrostatic charge interference to the display panel without adopting a back side process on the color filter substrate, such that no extra investment or equipment for the back side process are needed. Therefore, the color filter substrate of the invention can be produced at a low cost.

In the aforesaid first embodiment, the second transparent conductive film 160 is disposed on the inner side of the glass substrate 120 and on the outer side of the light-shielding matrix and the color layers 124R, 124G and 124B. However, the invention is not limited to such a configuration.

Figure 3:
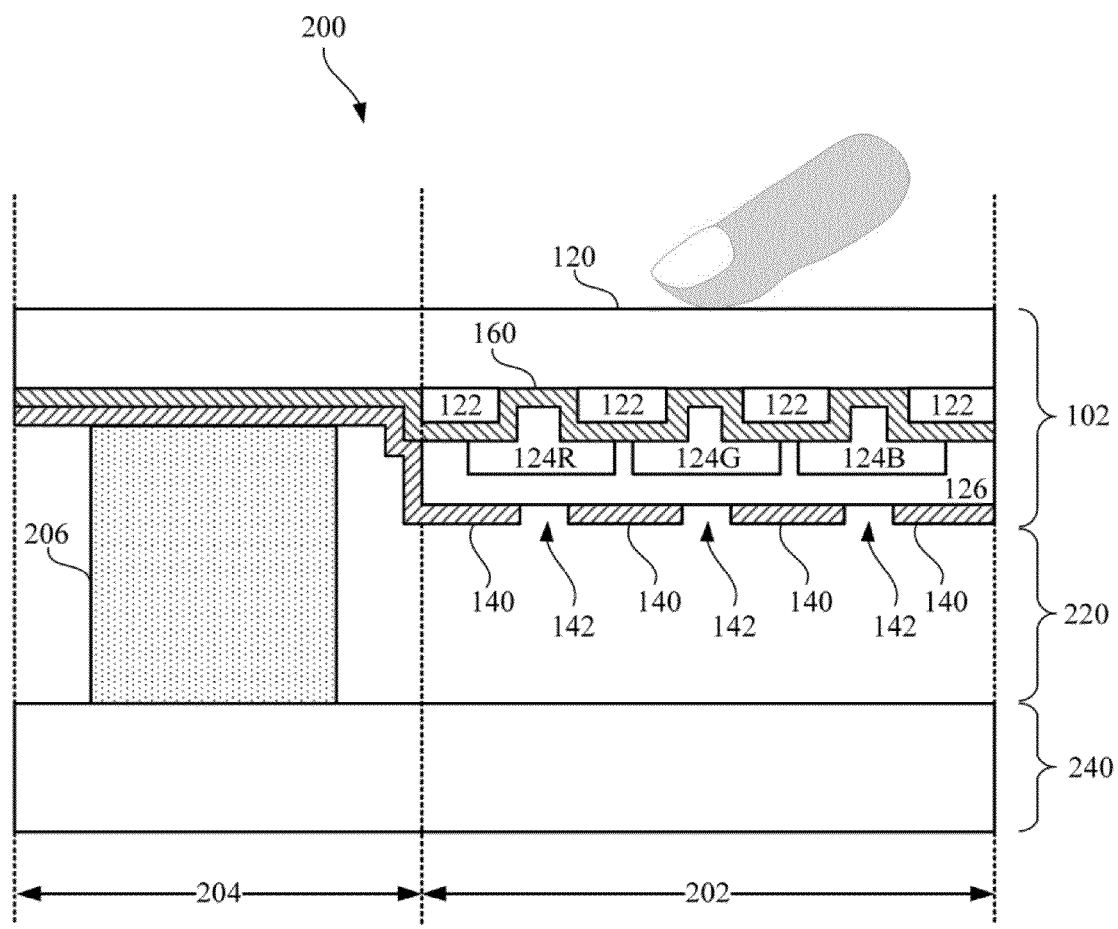
FIG. 3 is a sectional view illustrating a color filter substrate within an LCD apparatus according to a second embodiment of the invention.
Figure 4:
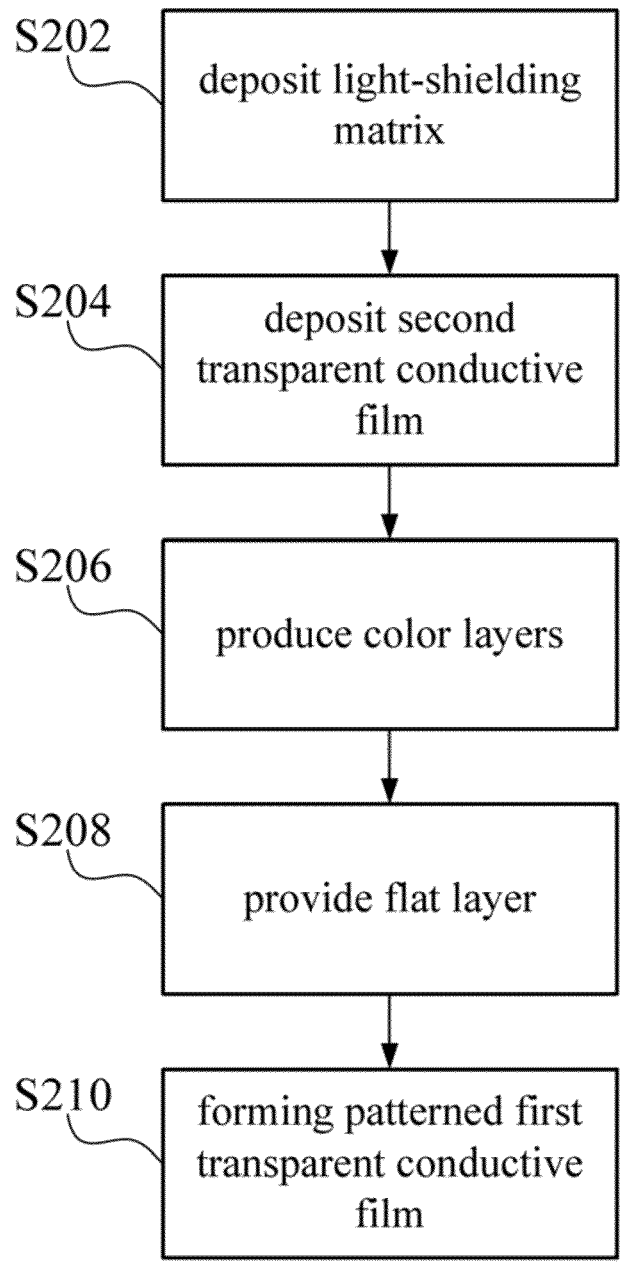
FIG. 4 is a flow chart illustrating a manufacturing method of a color filter substrate according to an embodiment of the invention.

Reference is made to FIG. 3 and FIG. 4. FIG. 3 is a sectional view illustrating a color filter substrate 102 within an LCD apparatus 200 according to a second embodiment of the invention. FIG. 4 is a flow chart illustrating a manufacturing method of a color filter substrate according to an embodiment of the invention. The manufacturing method can be used to produce the color filter substrate 102 shown in FIG. 3 of the second embodiment of the invention.

As shown in FIG. 3, the color filter substrate 102 includes a glass substrate 120, a light-shielding matrix 122, a color layer 124R, a color layer 124G, a color layer 124B, a first transparent conductive film 140 and a second transparent conductive film 160 within a display area 202 of the LCD apparatus 200.

It is noted that the second transparent conductive film 160 of the color filter substrate 102 is disposed on the inner side of the glass substrate 120 and the light-shielding matrix 122, and also on the outer side of the color layers 124R, 124G and 124B. As shown in FIG. 3, the second transparent conductive film 160 may utilize its conductivity to form a complete shielding plane corresponding to the liquid crystal layer 220, so as to block external electric field interference to the liquid crystal layer 220 of the LCD apparatus 200.

Other aspects of the color filter substrate 102 in the second embodiment are similar to those of the first embodiment, such that reference can be made to the first embodiment for further details. A description of such aspects of the color filter substrate 102 will not to be repeated.

As shown in FIG. 4 (and with additional reference to FIG. 3), the manufacturing method of the color filter substrate first executes step S202 to deposit the light-shielding matrix on the glass substrate for separating the display zones of different pixels or different colors. Afterward, step S204 is executed to deposit the second transparent conductive film on the glass substrate and the light-shielding matrix. Afterward, step S206 is executed for producing color layers on the second transparent conductive film and the to light-shielding matrix, e.g., forming the R, G, B color layers with a lithography process. Afterward, step S208 is executed for providing a flat layer, which is used for covering the color layers and the second transparent conductive film. Finally, step S110 is executed for forming a patterned first transparent conductive film on the flat layer. The pattern first transparent conductive film has at least one slit structure. In this embodiment, the patterned first transparent conductive film has a plurality of the slit structures. The slit structures correspond in location to the color layers respectively.

Figure 5:
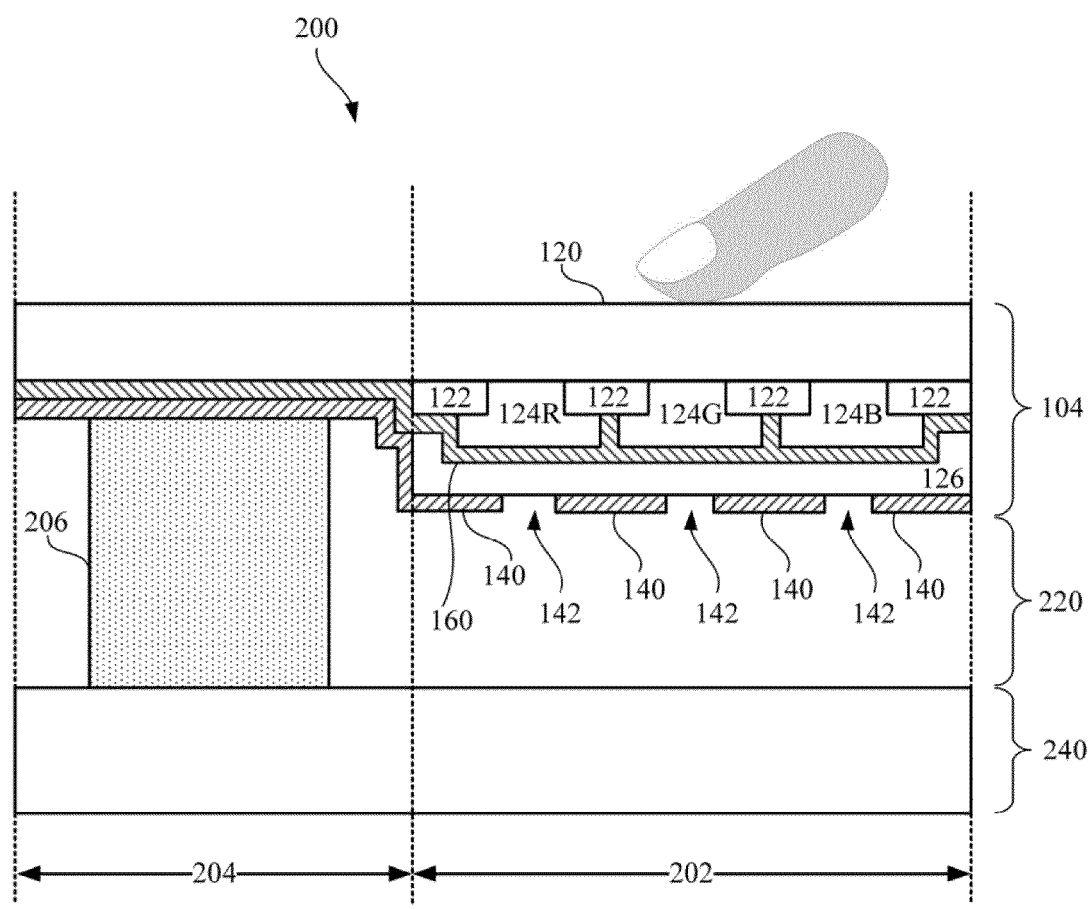
FIG. 5 is a sectional view illustrating a color filter substrate within an LCD apparatus according to a third embodiment of the invention.
Figure 6:
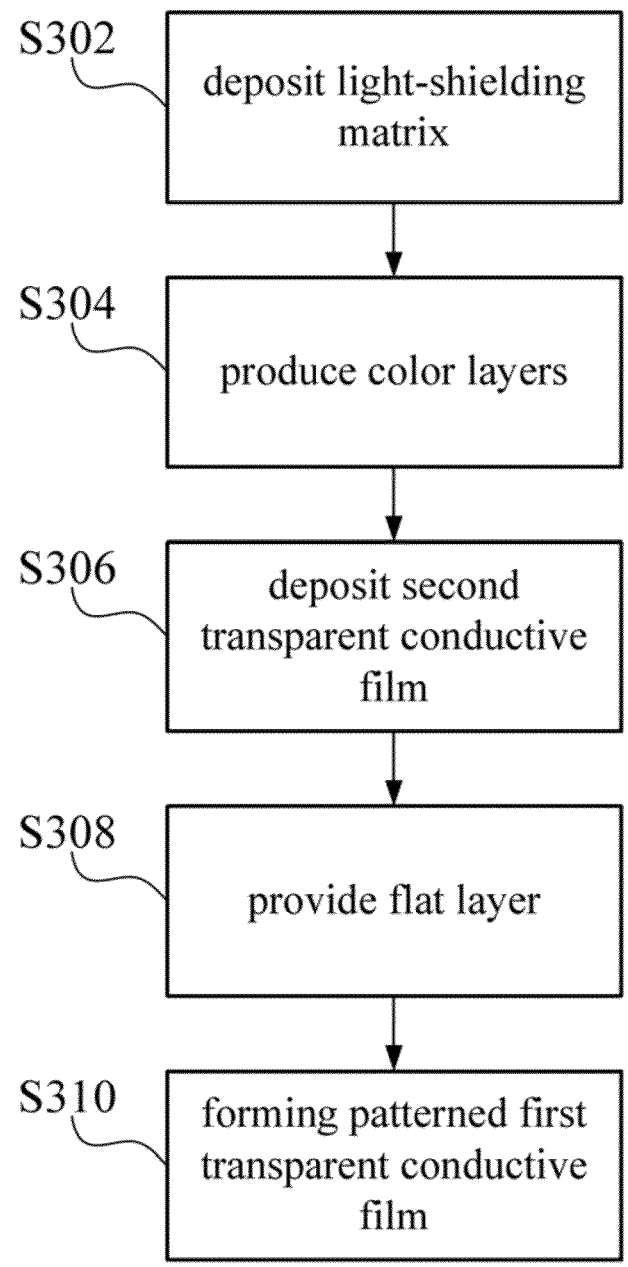
FIG. 6 is a flow chart illustrating a manufacturing method of a color filter substrate according to an embodiment of the invention.

Reference is made to FIG. 5 and FIG. 6. FIG. 5 is a sectional view illustrating a color filter substrate 104 within an LCD apparatus 200 according to a third embodiment of the invention. FIG. 6 is a flow chart illustrating a manufacturing method of a color filter substrate according to an embodiment of the invention. The manufacturing method can be used to produce the color filter substrate 104 shown in FIG. 5 of the third embodiment of the invention.

As shown in FIG. 5, the color filter substrate 104 includes a glass substrate 120, a light-shielding matrix 122, a color layer 124R, a color layer 124G, a color layer 124B, a first transparent conductive film 140 and a second transparent conductive film 160 within a display area 202 of the LCD apparatus 200.

It is noted that the second transparent conductive film 160 of the color filter substrate 104 is disposed on the inner side of the glass substrate 120, the light-shielding matrix 122 and the color layers 124R, 124G and 124B. As shown in FIG. 5, the second transparent conductive film 160 may utilize its conductivity to form a complete shielding plane corresponding to the liquid crystal layer 220, so as to block external electric field interference to the liquid crystal layer 220 of the LCD apparatus 200.

Other aspects of the color filter substrate 104 in the third embodiment are similar to those of the first embodiment, such that reference can be made to the first embodiment for further details. A description of such aspects of the color filter substrate 104 will not to be repeated.

As shown in FIG. 6 (and with additional reference to FIG. 5), the manufacturing method of the color filter substrate first executes step S302 to deposit the light-shielding matrix on the glass substrate for separating the display zones of different pixels or different colors. Afterward, step S304 is executed for producing color layers on the glass substrate and the light-shielding matrix, e.g., forming the R, G, B color layers with a lithography process. Afterward, step S306 is executed for depositing the second transparent conductive film on the light-shielding matrix and the color layers. Afterward, step S308 is executed for providing a flat layer, which is used for covering the second transparent conductive film. Finally, step S310 is executed for forming a patterned first transparent conductive film on the flat layer. The patterned first transparent conductive film has at least one slit structure. In this embodiment, the patterned first transparent conductive film has a plurality of the slit structures. The slit structures correspond in location to the color layers respectively.

The aforesaid first, second and third embodiments of the invention disclose a color filter substrate and the manufacturing method thereof. The color filter substrate includes a shielding structure on the inner side of the color filter substrate. The shielding structure may correspond to various kinds of display panels with ITO openings (e.g., slits or round holes), for example, a Patterned Vertical Alignment (PVA) display panel, an In-Plane Switching (IPS) display panel, a Fringe Field Switching (FFS) display panel, etc. The shielding structure can be used for solving the problem of electrostatic charge interference to the display panel without adopting a back side process on the color filter substrate, such that no extra investment or equipment for the back side process are needed. However, it is noted that the invention is not limited with respect to the necessity of the second transparent conductive film.

Figure 7:
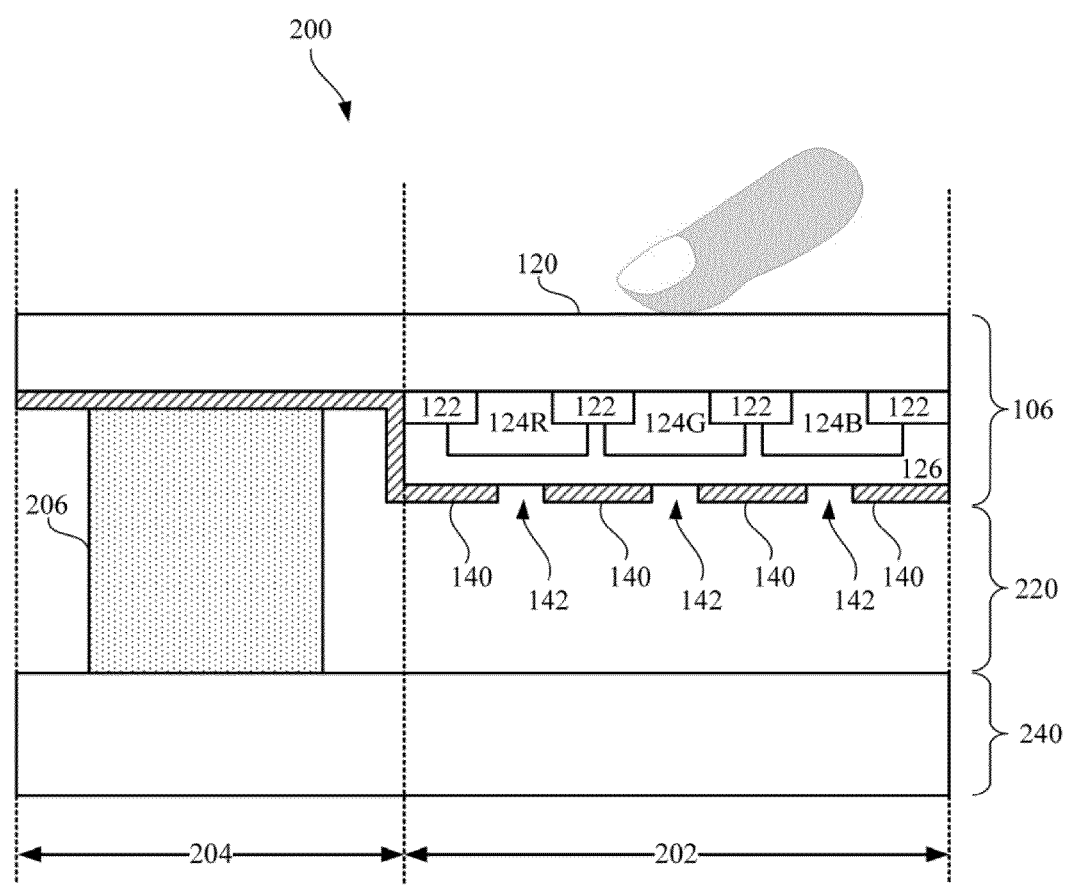
FIG. 7 is a sectional view illustrating an LCD apparatus and a color filter substrate thereof according to a fourth embodiment of the invention.
Figure 8:
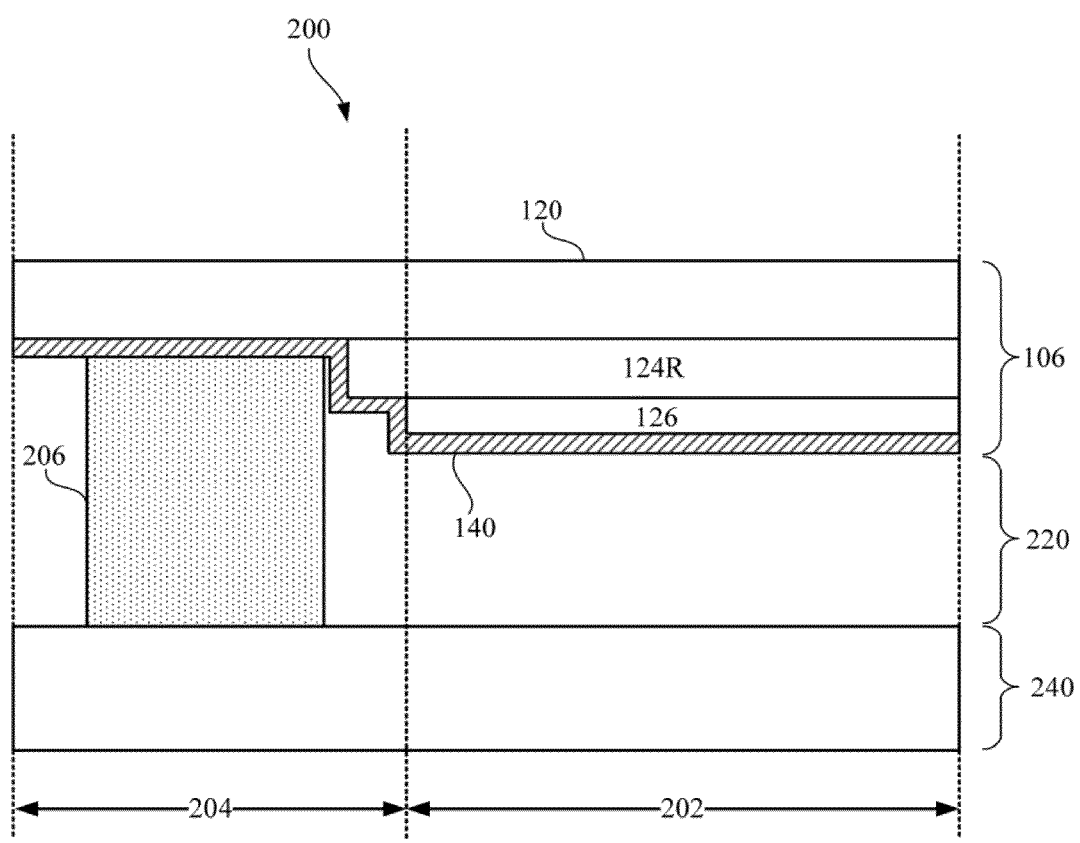
FIG. 8 is a sectional view illustrating the LCD apparatus and the color filter substrate of FIG. 7 from another angle according to a fourth embodiment of the invention.

Reference is made to FIG. 7 and FIG. 8. FIG. 7 is a sectional view illustrating a LCD apparatus 200 and a color filter substrate 106 thereof according to a fourth embodiment of the invention. FIG. 8 is a sectional view illustrating the LCD apparatus 200 and the color filter substrate 106 thereof from another viewing angle according to a fourth embodiment of the invention. In this embodiment, FIG. 7 and FIG. 8 are sectional views respectively from a horizontal direction and a vertical direction.

As shown in FIG. 7, the color filter substrate 106 in the fourth embodiment can be used in an LCD apparatus 200. The color filter substrate 100 includes a glass substrate 120, a light-shielding matrix 122, a color layer 124R, a color layer 124G, a color layer 124B, and a transparent conductive film 140. The light-shielding matrix 122 is disposed on the inner side of the glass substrate 120. The color layers 124R, 124G and 124B are disposed on the inner side of the glass substrate 120 and each color layer 124R, 124G or 124B is partially disposed between two of the light-shielding matrix 122. The color layers 124R, 124G and 124B include a high conductivity material. The transparent conductive film 140 has at least one slit structure 142. In this embodiment, the transparent conductive film 140 has a plurality of the slit structures 142. The slit structures 142 correspond to the color layers 124R, 124G and 124B respectively.

It is noted that in the fourth embodiment, instead of implementing two layers of transparent conductive films, the transparent conductive film 140 and the color layers 124R, 124G and 124B cooperate to form a complete shielding plane to prevent external interference to the liquid crystal layer 220.

In the fourth embodiment, the color layers 124R, 124G and 124B include a high conductivity material, i.e., a low resistivity material. In some embodiments, the resistivity of the high conductivity material included in the color layers 124R, 124G and 124B is less than $10^5$ ohm-cm, and can be further less than $10^4$ ohm-cm or $10^3$ ohm-cm. For example, the color layers 124R, 124G and 124B may include an organic high conductivity material (e.g., pentacene material) or a semiconductor material doped with conductive elements (such as chromium or tungsten).

Furthermore, FIG. 8 is a sectional view from a vertical direction. The sealant area 204 on the left side of FIG. 8 represents the sealant area 204 on the top of the LCD apparatus 200. In the fourth embodiment shown in FIG. 8, there is no flat layer 126 disposed within the sealant area 204 on the color filter substrate 106, such that the transparent conductive film 140 may directly connect to the color layers 124R, 124G and 124B with high conductivity. Therefore, the transparent conductive film 140 can be electrically connected to the color layers 124R, 124G and 124B, so as to cooperate to form a complete shielding plane.

In this case, the color filter substrate in the fourth embodiment utilizes the transparent conductive film and the color layer to form a shielding structure on the inner side of the color filter substrate. The shielding structure may correspond to various kinds of display panels with ITO openings (e.g., slits or round holes), for example, a Patterned Vertical Alignment (PVA) display panel, an In-Plane Switching (IPS) display panel, a Fringe Field Switching (FFS) display panel, etc. The shielding structure can be used for solving the problem of electrostatic charge interference to the display panel without adopting a back side process on the color filter substrate, such that no extra investment or equipment for the back side process are needed.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A color filter substrate for a liquid crystal display apparatus, the color filter substrate comprising:
    a glass substrate;
    a color layer;
    a light-shielding matrix disposed between the glass substrate and the color layer;
    a first transparent conductive film having at least one slit structure, each slit structure corresponding to the color layer respectively; and
    a second transparent conductive film, wherein the first transparent conductive film and the second transparent conductive film are disposed on the same side of the glass substrate, wherein the second transparent conductive film is disposed between the light-shielding matrix and the color layer.

2. The color filter substrate of claim 1, wherein the liquid crystal display apparatus comprises a lower substrate and a liquid crystal layer, the liquid crystal layer is disposed between the lower substrate and the color filter substrate, and the second transparent conductive film is utilized for forming a complete shielding plane corresponding to the liquid crystal layer.

3. The color filter substrate of claim 1, wherein the high conductivity material of the color layer has a resistivity of less than $10^5$ ohm-cis.

4. A liquid crystal display apparatus, comprising:
    a lower substrate;
    a color filter substrate comprising:
        a glass substrate;
        a color layer;
        a light-shielding matrix disposed between the glass substrate and the color layer;
        a first transparent conductive film having at least one slit structure, the at least one slit structure corresponding to the color layer; and
        a second transparent conductive film, the first transparent conductive film and the second transparent conductive film being disposed on the same side of the glass substrate, wherein the second transparent conductive film is disposed between the light-shielding matrix and the color layer; and
    a liquid crystal layer disposed between the color filter substrate and the lower substrate, the second transparent conductive film forming a complete shielding plane corresponding to the liquid crystal layer.

5. The liquid crystal display apparatus of claim 4, wherein the high conductivity material of the color layer has a resistivity of less than $10^5$ ohm-cm.

* * * * *